(12) United States Patent
Larson et al.

(10) Patent No.: US 10,866,026 B2
(45) Date of Patent: *Dec. 15, 2020

(54) ANNULAR DIVIDED WALL COLUMN

(71) Applicants: Kirk F. Larson, Amherst, NY (US);
Paul W. Belanger, Clarence Center, NY (US); Steven C. Brown, Williamsville, NY (US); John P. Ricotta, Kenmore, NY (US); Guang X. Chen, Williamsville, NY (US); Richard D. Lenz, Tonawanda, NY (US)

(72) Inventors: Kirk F. Larson, Amherst, NY (US);
Paul W. Belanger, Clarence Center, NY (US); Steven C. Brown, Williamsville, NY (US); John P. Ricotta, Kenmore, NY (US); Guang X. Chen, Williamsville, NY (US); Richard D. Lenz, Tonawanda, NY (US)

(73) Assignee: PRAXAIR TECHNOLOGY, INC., Danbury, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 16/857,831

(22) Filed: Apr. 24, 2020

(65) Prior Publication Data

US 2020/0256616 A1 Aug. 13, 2020

Related U.S. Application Data

(63) Continuation of application No. 16/042,189, filed on Jul. 23, 2018, now Pat. No. 10,684,071.

(51) Int. Cl.
*B01D 3/14* (2006.01)
*F25J 3/04* (2006.01)
(Continued)

(52) U.S. Cl.
CPC .......... *F25J 3/04939* (2013.01); *B01D 3/141* (2013.01); *B01J 19/30* (2013.01); *B01J 19/305* (2013.01);
(Continued)

(58) Field of Classification Search
CPC . B01D 3/141; B01D 3/30; B01D 3/32; B01D 3/324; B01D 3/326; F25J 3/04;
(Continued)

(56) References Cited

U.S. PATENT DOCUMENTS 5,339,648 A    8/1994  Lockett et al.
5,632,934 A    5/1997  Billingham et al.
(Continued)

FOREIGN PATENT DOCUMENTS

CN    106 642 987        5/2017
EP    1 647 318 A2       4/2006
(Continued)

OTHER PUBLICATIONS

Helmut Jansen et al.; "New Horizons for Dividing Wall Columns"; Chemical Engineering, pp. 40-48; www.che.com; Aug. 1, 2014; XP055384430.
(Continued)

*Primary Examiner* — Jonathan Luke Pilcher
(74) *Attorney, Agent, or Firm* — Robert J. Hampsch

(57) ABSTRACT

An annular divided wall column is provided. The annular divided wall column includes a first annular column wall and a second annular column wall disposed within the first annular column wall and radially spaced therefrom to define an annulus column region as the space between the first annular column wall and the second annular column wall. An interior core column region is also defined by the interior space of the second annular column wall. The present annular divided wall column further includes a plurality of
(Continued)

packing elements, disposed within the interior core column region within the annulus column region having different surface area densities and optionally, also have different geometries.

8 Claims, 13 Drawing Sheets

(51) Int. Cl.
 *B01J 19/30* (2006.01)
 *B01J 19/32* (2006.01)
(52) U.S. Cl.
 CPC ............ *B01J 19/32* (2013.01); *F25J 3/0409* (2013.01); *F25J 3/04084* (2013.01); *F25J 3/04096* (2013.01); *F25J 3/04672* (2013.01); *F25J 3/04872* (2013.01); *F25J 3/04884* (2013.01); *F25J 3/04896* (2013.01); *F25J 3/04903* (2013.01); *F25J 3/04909* (2013.01); *F25J 3/04921* (2013.01); *F25J 3/04927* (2013.01); *B01J 2219/00768* (2013.01); *B01J 2219/185* (2013.01); *B01J 2219/3085* (2013.01); *B01J 2219/30203* (2013.01); *B01J 2219/30223* (2013.01); *B01J 2219/315* (2013.01); *F25J 3/04* (2013.01); *F25J 2205/02* (2013.01); *F25J 2290/44* (2013.01)
(58) Field of Classification Search
 CPC .... F25J 3/04018; F25J 3/04024; F25J 3/0403; F25J 3/04036; F25J 3/04042; F25J 3/04048; F25J 3/04054; F25J 3/0406; F25J 3/04066; F25J 3/04072; F25J 3/04406; F25J 3/04418; F25J 3/04424; F25J 3/044; F25J 3/04412; F25J 3/04666; F25J 3/04939; F25J 3/04896; F25J 3/04909; F25J 3/04915; F25J 3/04921; F25J 3/04927; F25J 3/04933; B01J 19/325
 See application file for complete search history.

(56) References Cited

U.S. PATENT DOCUMENTS

| | | | |
|---|---|---|---|
| 5,946,942 A | 9/1999 | Wong et al. | |
| 6,023,945 A | 2/2000 | Wong et al. | |
| 6,214,174 B1 | 4/2001 | Matsumoto | |
| 6,240,744 B1 | 6/2001 | Agrawal et al. | |
| 7,604,222 B2 | 10/2009 | Zone et al. | |
| 7,678,237 B2 | 3/2010 | De Graauw et al. | |
| 8,480,860 B2 | 7/2013 | Kovak | |
| 9,004,460 B2 | 4/2015 | Brown et al. | |
| 9,295,925 B2 | 3/2016 | Chen et al. | |
| 9,375,655 B2 | 6/2016 | Billingham et al. | |
| 9,457,291 B2 | 10/2016 | Brown et al. | |
| 9,827,543 B2 | 11/2017 | Pretz | |
| 10,578,355 B2* | 3/2020 | Saboda | F25J 3/0409 |
| 10,578,356 B2* | 3/2020 | Saboda | F25J 3/04084 |
| 10,578,357 B2* | 3/2020 | Saboda | B01J 19/325 |
| 10,684,071 B2* | 6/2020 | Larson | F25J 3/04872 |
| 2004/0134135 A1 | 7/2004 | Zich et al. | |
| 2006/0082006 A1 | 4/2006 | Zone | |
| 2006/0230613 A1 | 10/2006 | Whittenberger | |
| 2013/0233016 A1 | 9/2013 | Wilson et al. | |
| 2016/0061541 A1 | 3/2016 | Chen et al. | |
| 2017/0030638 A1 | 2/2017 | Prosser et al. | |
| 2017/0030639 A1 | 2/2017 | Du et al. | |
| 2017/0051971 A1 | 2/2017 | Goloubev | |
| 2017/0108148 A1 | 4/2017 | Lu et al. | |
| 2017/0108296 A1 | 4/2017 | Kwark et al. | |
| 2019/0063828 A1 | 2/2019 | Larson | |
| 2020/0149809 A1* | 5/2020 | Saboda | F25J 3/0409 |
| 2020/0149810 A1* | 5/2020 | Saboda | F25J 3/04896 |

FOREIGN PATENT DOCUMENTS

| | | |
|---|---|---|
| FR | 2 776 206 A1 | 9/1999 |
| WO | WO 2011/064580 | 6/2011 |
| WO | WO 2012/056278 | 5/2012 |
| WO | WO 2012/058009 | 5/2012 |
| WO | WO 2016/138995 | 9/2016 |
| WO | WO 2017/084729 A1 | 5/2017 |

OTHER PUBLICATIONS

Koch-Glitsch, "Packed Tower Internals"; Bulletin KGMTIG-1. Rev. Jun. 2010, available online at http://folk.ntnu.no/skoge/prost/proceedings/distillation10/DA2010%20Sponsor%20Information/Koch%20Glitsch/Packed_Tower/Tower_Internatls/Metal_PTI.pdf (Year: 2010).

Koch-Glitsch, "Structured Packing", Bulletin KGSP-2. Rev. Apr. 2015, available online at: http://www.koch-glitsch.com/Document%20Library/KGSP.pdf (Year: 2015).

Koch-Glitsch; "Packed Tower Internals"; Bulletin KGMTIG-1. Rev. Jun. 2010. Available online at: http://folk.ntnu.no/skoge/prost/proceedings/distillation10/DA2010%20Information/Koch%20Glitsch/Packed_Tower/Tower_Internals/Metal_PTI.pdf (Year: 2010).

* cited by examiner

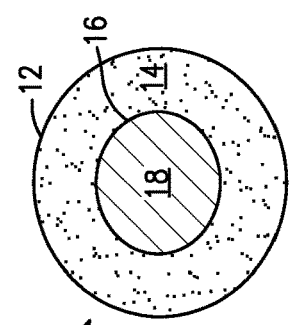

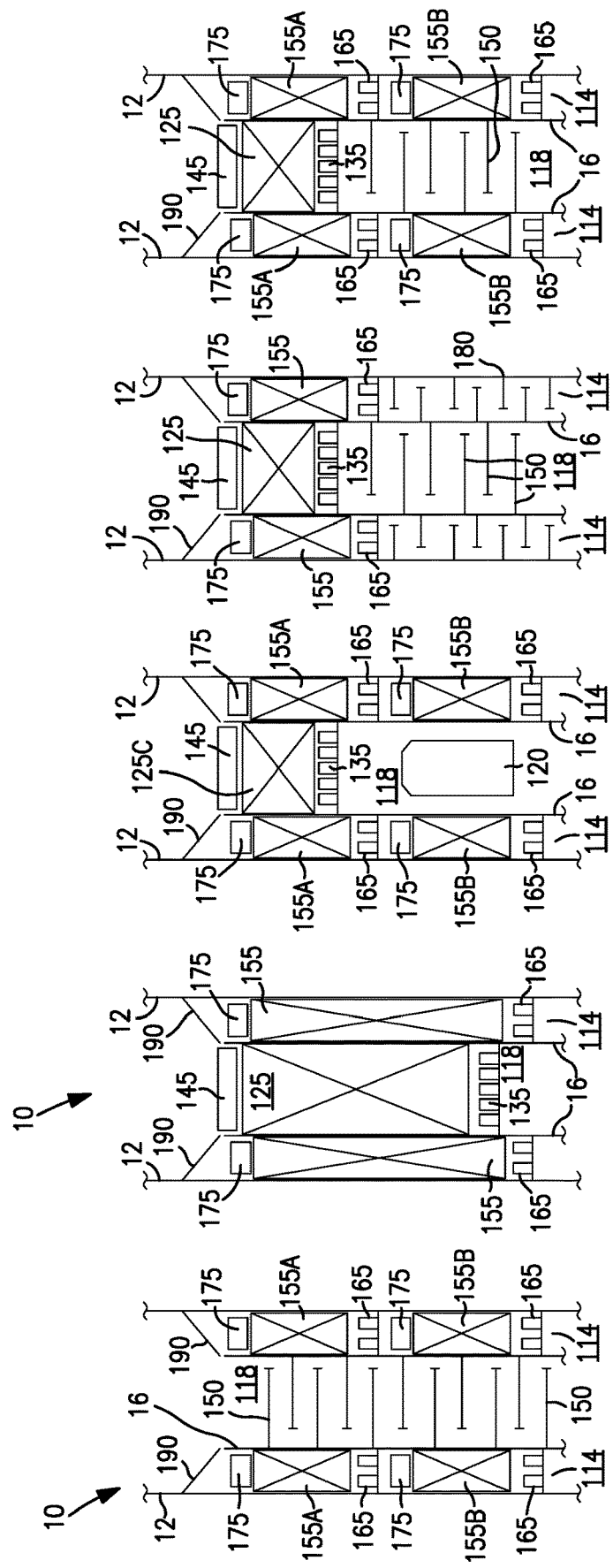

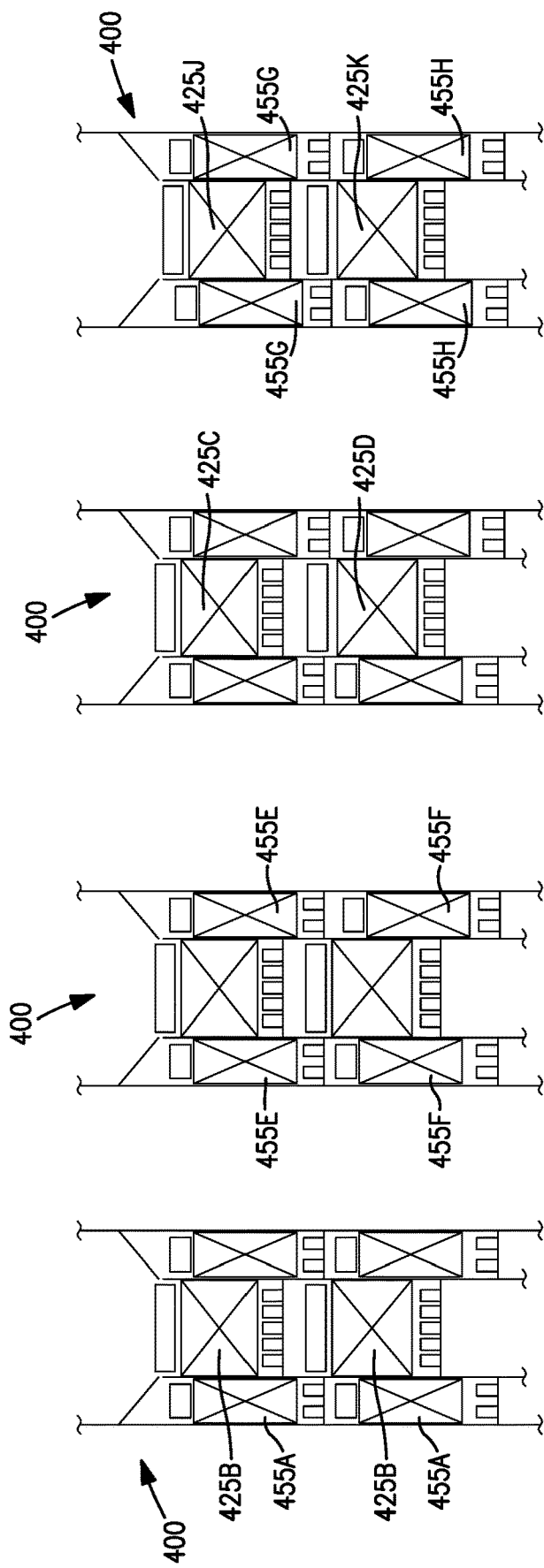

ANNULAR DIVIDED WALL COLUMN

CROSS REFERENCE TO RELATED APPLICATIONS

The present application is a continuation application of U.S. patent application Ser. No. 16/042,189 filed on Jul. 23, 2018 that claims the benefit of and priority to U.S. Provisional Patent Application Ser. No. 62/550,262 filed on Aug. 25, 2017, the disclosure of which is incorporated by reference herein.

FIELD OF THE INVENTION

The present invention relates to annular divided wall columns for the cryogenic distillation of air or constituents of air. More particularly, the present invention relates to an annular divided wall column that includes an annulus column region defined as the space between a first annular column wall and a second annular column wall and an interior core column region defined as the interior space of the second annular column wall with a plurality of packing elements or trays disposed within the interior core column region and the annulus column region.

BACKGROUND

A major capital expense of a rectification plant for the separation of air into components based on their relative volatility is the cost of the column casing and the space required for the column. This is particularly the case where two or more columns are required to conduct the separation. Such multi-column systems are often used in cryogenic rectification, such as in the cryogenic rectification of air, where columns may be stacked vertically or located side by side. It would be highly desirable to have a system which will enable rectification to be carried out with reduced column cost and with reduced space requirements for the columns.

Divided-wall columns have been proposed in the literature as a means to better utilize a given column diameter, and thereby reduce the capital cost associated with construction of a plant to facilitate the separation process. Divided-wall columns essentially contain multiple distillation sections at the same elevation within a single column shell. An early example of the use of a divided-wall column is disclosed in U.S. Pat. Nos. 5,946,942 and 6,023,945 (Wong, et al.) discloses an application of divided-wall principles to air separation. These prior art systems disclose an apparatus wherein the lower pressure column contains an inner annular wall. The region contained between the inner annular wall and the outer shell of the lower pressure column constitutes a section for the production of argon product. A drawback of the prior art divided-wall column structures includes maldistribution of vapor within the annular divided wall columns separation sections as well as maldistribution of the downflowing liquids due to the large wall surface area, especially if the separation sections use structured packing as the mass-transfer elements.

Accordingly it is an object of this invention to provide a column system for rectification of air which has reduced costs and space requirements over conventional air separation column systems and that overcomes the difficulties and disadvantages of the prior art annular divided wall columns to provide better and more advantageous performance.

SUMMARY OF THE INVENTION

The present invention may be characterized as an annular column comprising: (i) a first annular column wall; (ii) a second annular column wall radially spaced from the first annular column wall and disposed within a first interior space of the first annular column wall to define an annulus column region between the first annular column wall and the second annular column wall and to define an interior core column region as part or all of a second interior space of the second annular column wall; (iii) a plurality of structured packing elements of a first type disposed within the annulus column region; and (iv) a plurality of structured packing elements of a second type disposed within the interior core column region, wherein the first type of structured packing elements and the second type of structured packing elements have different surface area densities.

In some embodiments of the present annular divided wall column, the first type of structured packing elements and the second type of structured packing elements may also have different geometries, and in particular different nominal inclination angle of corrugations to the horizontal axis.

BRIEF DESCRIPTION OF THE DRAWINGS

While the specification concludes with claims distinctly pointing out the subject matter that applicants regard as their invention, it is believed that the invention will be better understood when taken in connection with the accompanying drawings in which:

FIG. 1 is a top section view of an annular divided wall column in accordance with one embodiment of the present invention;

FIG. 2 is a top section view of an annular divided wall column in accordance with another embodiment of the present invention;

FIG. 3 is a top section view of an annular divided wall column in accordance with yet another embodiment of the present invention;

FIG. 4 is a top section view of an annular divided wall column in accordance with yet another embodiment of the present invention;

FIG. 5 is a top section view of an annular divided wall column in accordance with yet another embodiment of the present invention;

FIG. 6 is a top section view of an annular divided wall column in accordance with yet another embodiment of the present invention;

FIG. 7 is a top section view of an annular divided wall column in accordance with yet another embodiment of the present invention;

FIG. 8 is a top section view of an annular divided wall column in accordance with yet another embodiment of the present invention;

FIG. 9 is a top section view of an annular divided wall column in accordance with yet another embodiment of the present invention;

FIG. 10 is a top section view of an annular divided wall column in accordance with yet another embodiment of the present invention;

FIG. 11 is a side section, cut-away view of a two-column divided wall arrangement in accordance with an embodiment of the present invention;

FIG. 12 is a side section, cut-away view of a two-column divided wall arrangement in accordance with another embodiment of the present invention;

FIG. 13 is a side section, cut-away view of an annular divided wall column in accordance with one or more embodiments of the present invention;

FIG. 14 is a side section, cut-away view of an annular divided wall column in accordance with further embodiments of the present invention;

FIG. 15 is a side section, cut-away view of an annular divided wall column in accordance with still further embodiments of the present invention;

FIG. 16 is a top section view of a three-column divided wall arrangement in accordance with an embodiment of the present invention;

FIG. 18 is a top section view of another three-column divided wall arrangement in accordance with an embodiment of the present invention;

FIG. 28 is a side section view of an annular divided wall column in accordance with one or more embodiments of the present invention;

FIG. 29 is a side section view of an annular divided wall column in accordance with various embodiments of the present invention;

FIG. 30 is a side section view of an annular divided wall column in accordance with further embodiments of the present invention; and FIG. 31 is a side section view of an annular divided wall column in accordance with still further embodiments of the present invention.

DETAILED DESCRIPTION

Figure 19:
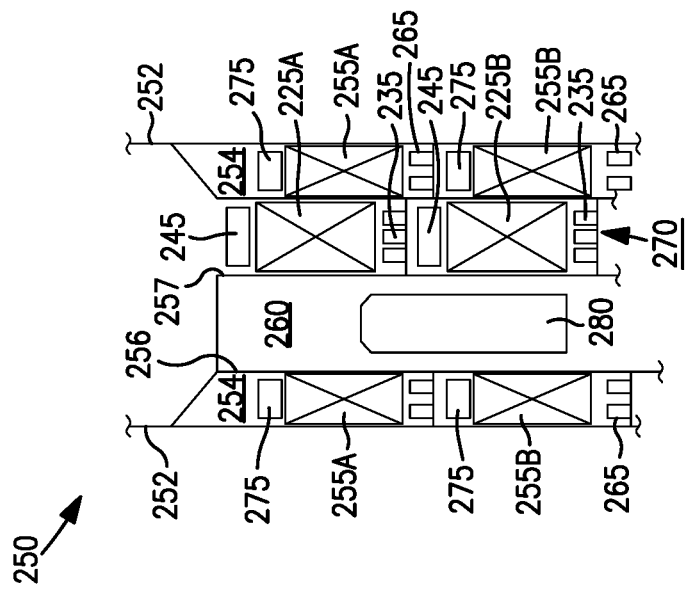
FIG. 19 is a side section, cut-away view of the three-column divided wall arrangement of FIG. 15.

The following paragraphs include detailed descriptions of various embodiments of the present annular divided wall column for the cryogenic rectification of air, including descriptions of: (i) annular divided wall column structures; (ii) process and/or service arrangements for the different regions within the annular divided wall column; and (iii) arrangements of mass transfer elements within the annular divided wall column.

Annular Divided Wall Column Structures

As seen in the FIGS. 1 through 10, embodiments of the present annular divided wall column 10 include a first annular column wall 12 and the second annular column wall 16 that may be concentrically disposed relative to one another as shown in FIGS. 1 through 8 or may be eccentrically disposed relative to one another as shown in FIGS. 9 and 10. As further shown in the drawings, the first annular column wall 12 may have a cylindrical configuration with a cross section that is circular (See FIGS. 1 through 6) or elliptical configuration (See FIGS. 7 and 8) and the second annular column wall 16 may also have a cross-section configuration that is circular (See FIGS. 1 through 5, 8, and 9) or elliptical (See FIGS. 6, 7, and 10).

Examples of different arrangements of mass transfer elements and other devices employed within the present annular divided wall column are generally depicted in FIGS. 1 through 10 where structured packing elements are shown as hatched sections and trays are depicted as shaded sections.

In FIG. 1 and FIG. 6, the annulus column region 14 preferably contains structured packing as well as the associated collectors, distributors, support structures, caps and piping while the interior core column region 18 also contains structured packing and the associated collectors, distributors, support structures, caps and piping. The surface area density and/or geometry of the structured packing elements in the annulus column region 14 may be the same as or different than the surface area density and/or geometry of the structured packing elements in the interior core column region 18.

In FIG. 2, FIG. 8 and FIG. 9, the annulus column region 14 preferably contains a plurality of structured packing elements as well as the associated collectors, distributors, support structures, caps, and piping while the interior core column region 18 preferably includes a plurality of trays. Similarly, FIG. 3, FIG. 7, and FIG. 10 show embodiments of the annular divided wall column 10 wherein the annulus column region 14 preferably contains structured packing elements as well as the associated collectors, distributors, support structures, caps, and piping while the interior core column region 18 preferably includes a heat exchange device 20, a phase separator device and/or one or more conduits for the movement of liquids and/or vapors within the column.

In FIG. 4, the annulus column region 14 preferably contains a plurality of trays while the interior core column region 18 preferably contains trays and one or more beds of structured packing elements as well as the associated collectors, distributors, support structures, caps, and piping. In FIG. 5, the annulus column region 14 preferably contains one or more beds of structured packing elements as well as the associated collectors, distributors, support structures, and piping while the interior core column region 18 preferably contains trays and one or more beds of structured packing elements as well as the associated collectors, distributors, support structures, caps, and piping.

Turning now to FIGS. 11 through 15, there is shown selected embodiments of a two-column annular divided wall arrangement 100 for the cryogenic rectification of air, and having two concentric annular column walls. The first annular column wall 112 is preferably formed by the exterior shell of the air separation column structure such while the second annular column wall 116 extends over only a portion or section of the entire exterior column shell and is preferably disposed within the exterior shell of the air separation column structure. In such two-column divided wall arrangements, the vertical height of the first annular column wall 112 is preferably greater than a vertical height of the second annular column wall 116.

In FIG. 11, the interior core column region 118 contains one bed of structured packing elements 125 along with a collector 135 and distributor 145 while the annulus column region 114 also contains one bed of structured packing 155 along with an associated collector 165 and distributor 175. FIG. 12 depicts an embodiment where the interior core column region 118 contains a plurality of trays 150 while the annulus column region 114 also contains multiple beds of structured packing elements 155A, 155B along with an associated collectors 135 and distributors 145. FIG. 13 depicts an embodiment where the interior core column region 118 contains one bed of structured packing elements 125C along with the associated collector 135 and distributor 145 as well as a heat exchange device 120 such as an argon condenser while the annulus column region 114 also contains multiple beds of structured packing elements 155A, 155B along with an associated collectors 165 and distributors 175. FIG. 14 depicts yet another embodiment where the interior core column region 118 contains one bed of structured packing elements 125 along with the associated collector 135 and distributor 145 as well as a plurality of trays 150 while the annulus column region 114 also contains one bed of structured packing elements 155 along with the associated collector 165 and distributor 175 as well as a plurality of trays 180. Lastly, FIG. 15 depicts still another embodiment where the interior core column region 118 contains one or more beds of structured packing elements 125 along with the associated collector 135 and distributor 145 as well as a plurality of trays 150 while the annulus column region 114 contains multiple beds of structured packing elements 155A, 155B along with an associated collectors 165 and distributors a75.

In the illustrated two-column divided wall arrangements, a cap or header 190 may be employed to partially enclose either the annulus column region 114 or the interior core column region 118. To partially enclose the annulus column region 114, a cap or header 190 is placed above the annulus column region that extends from the top of the second annular column wall 116 to an intermediate location of the first annular column wall 112. To partially enclose the interior core column region, a cap or header is attached to the top of the second annular column wall 116 to cover the interior core column region 118.

Figure 17:
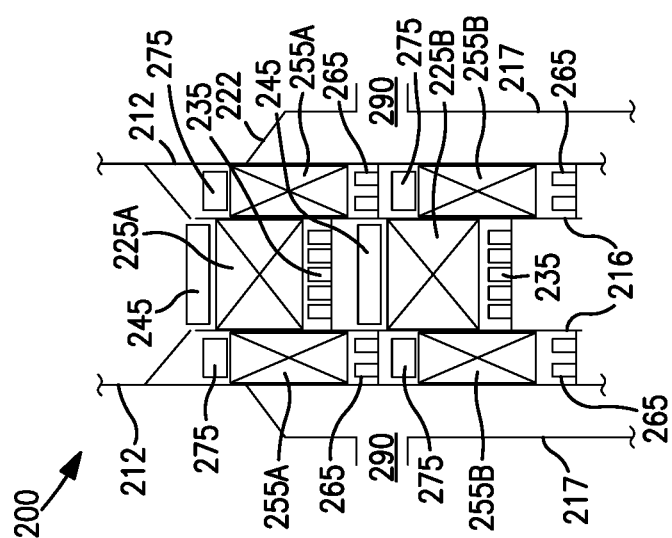
FIG. 17 is a side section, cut-away view of the three-column divided wall arrangement of FIG. 13.
Figure 20:
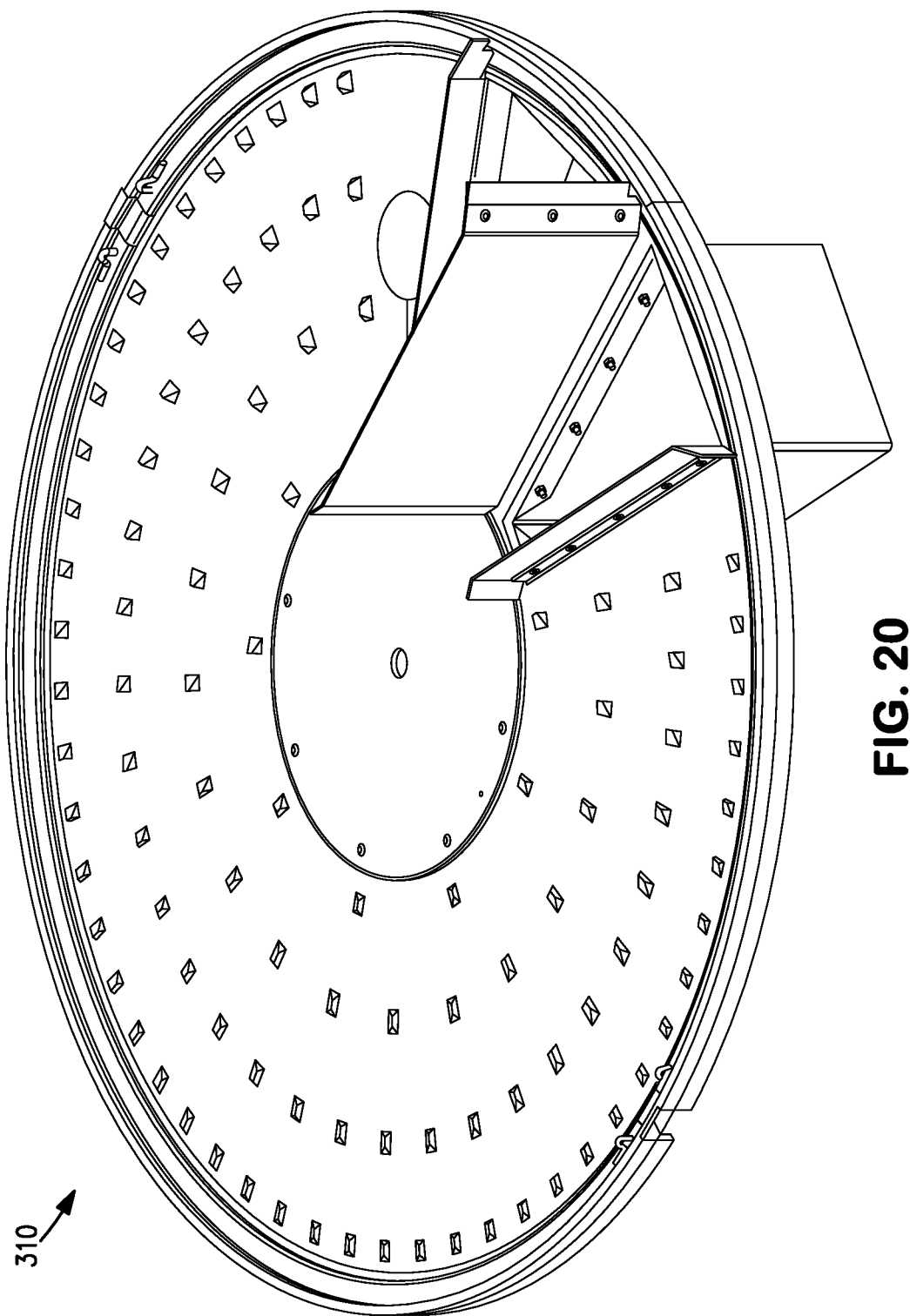
FIG. 20 is an isometric view of a ring tray suitable for use in one or more embodiments of the present annular divided wall column.
Figure 21:
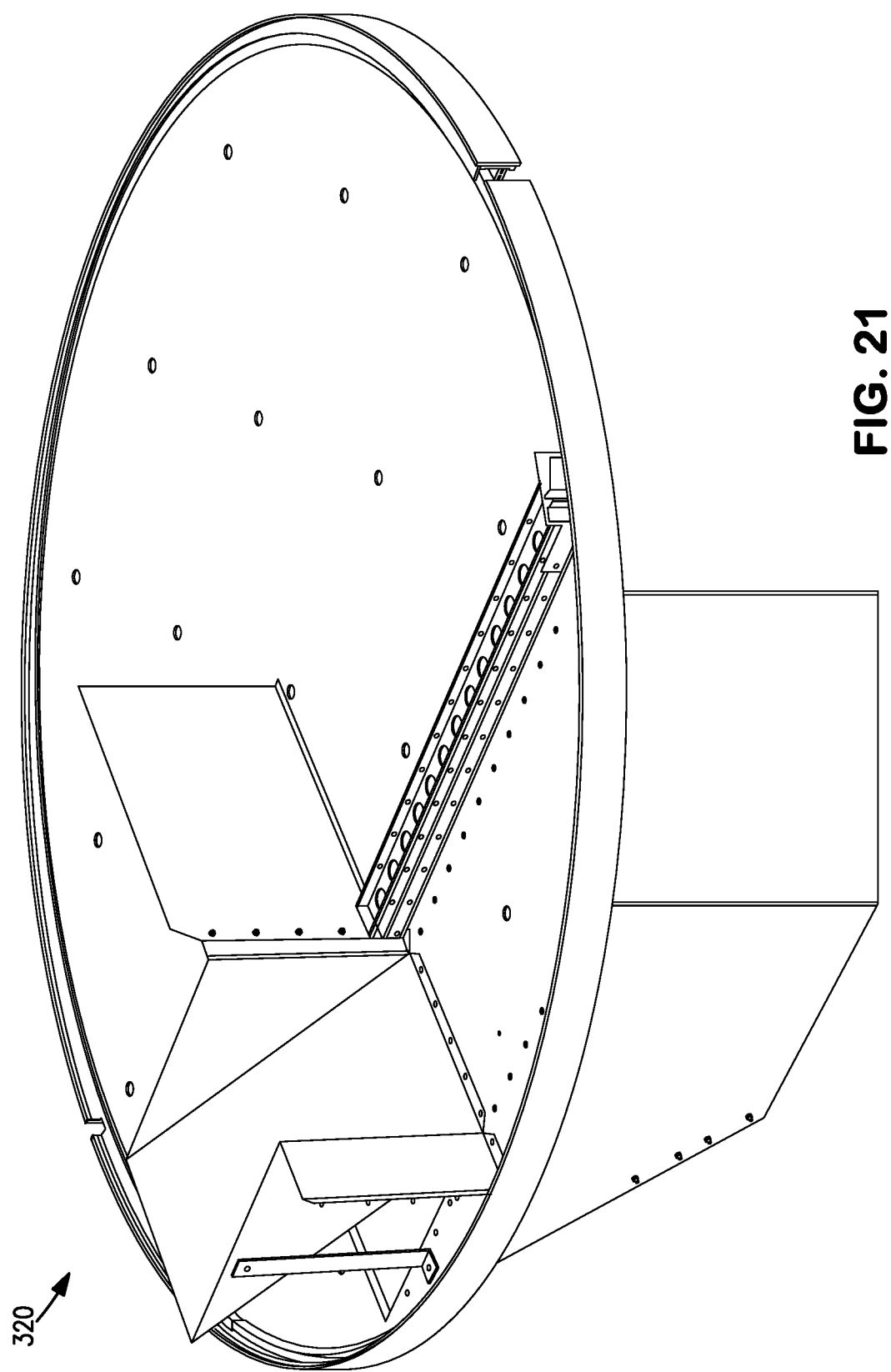
FIG. 21 is an isometric view of a horseshoe tray suitable for use in one or more embodiments of the present annular divided wall column.
Figure 22:
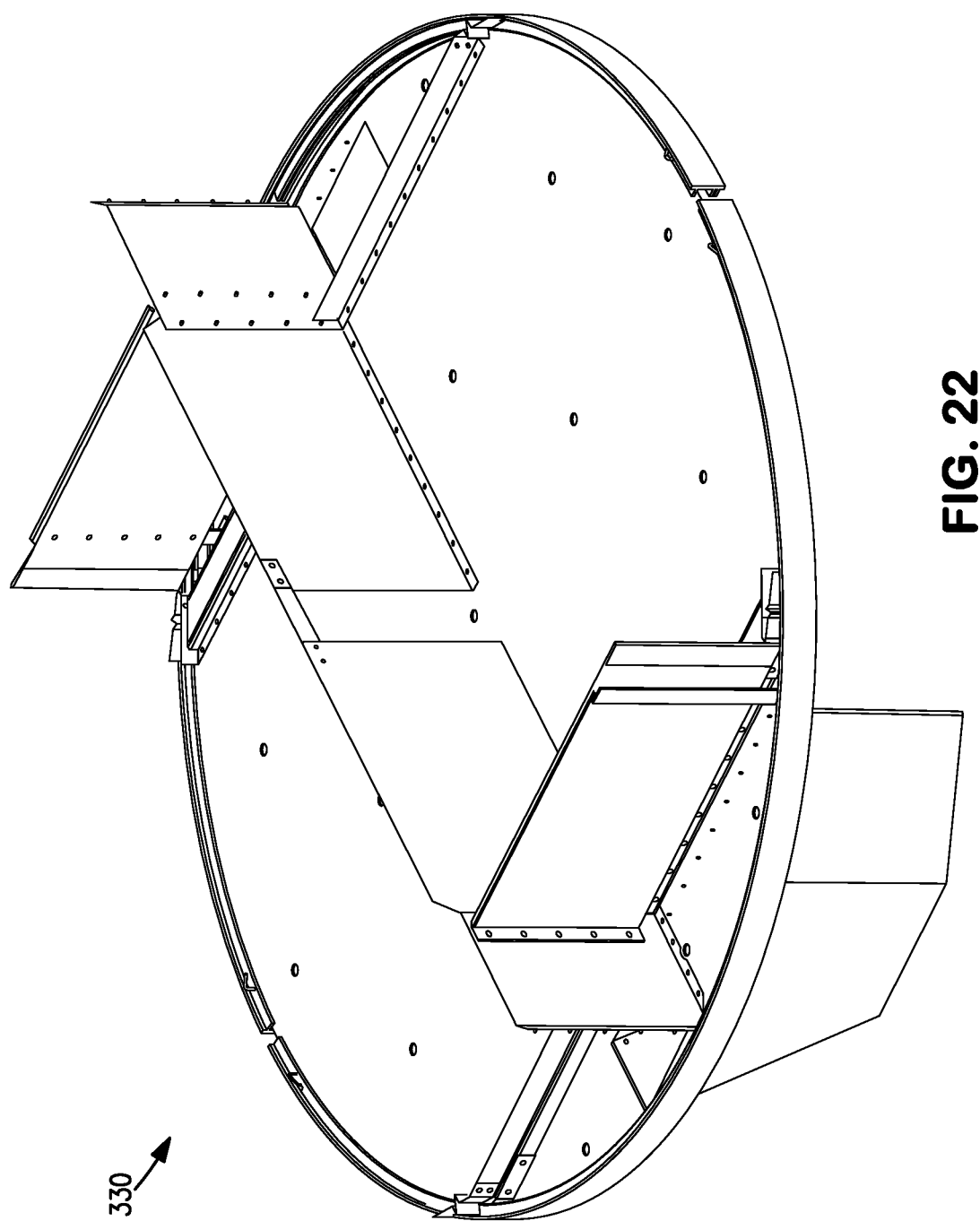
FIG. 22 is an isometric view of a parallel flow tray suitable for use in one or more embodiments of the present annular divided wall column.
Figure 23A:
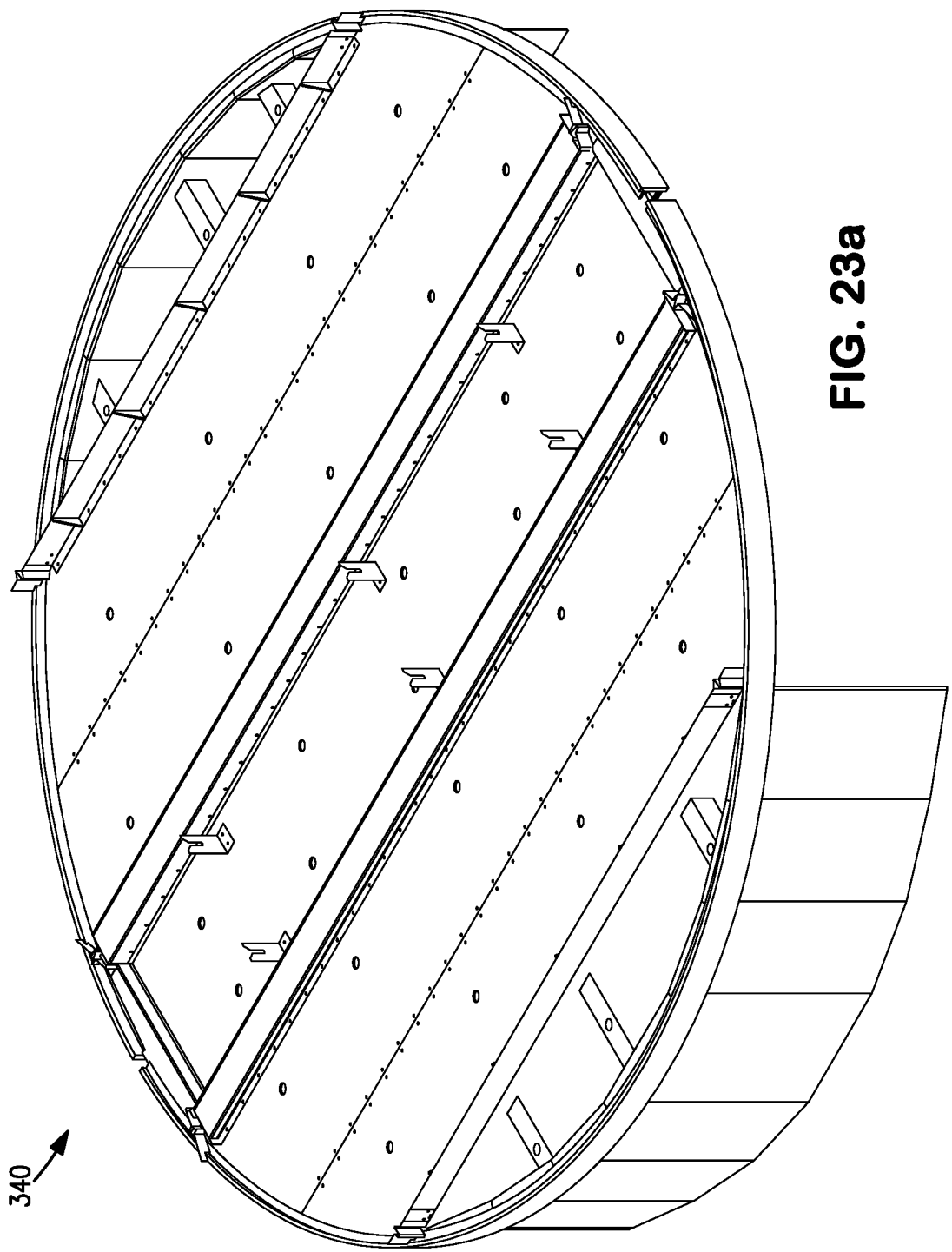
FIGS. 23a and 23b are isometric views of two-pass crossflow trays suitable for use in one or more embodiments of the present annular divided wall column.
Figure 23B:
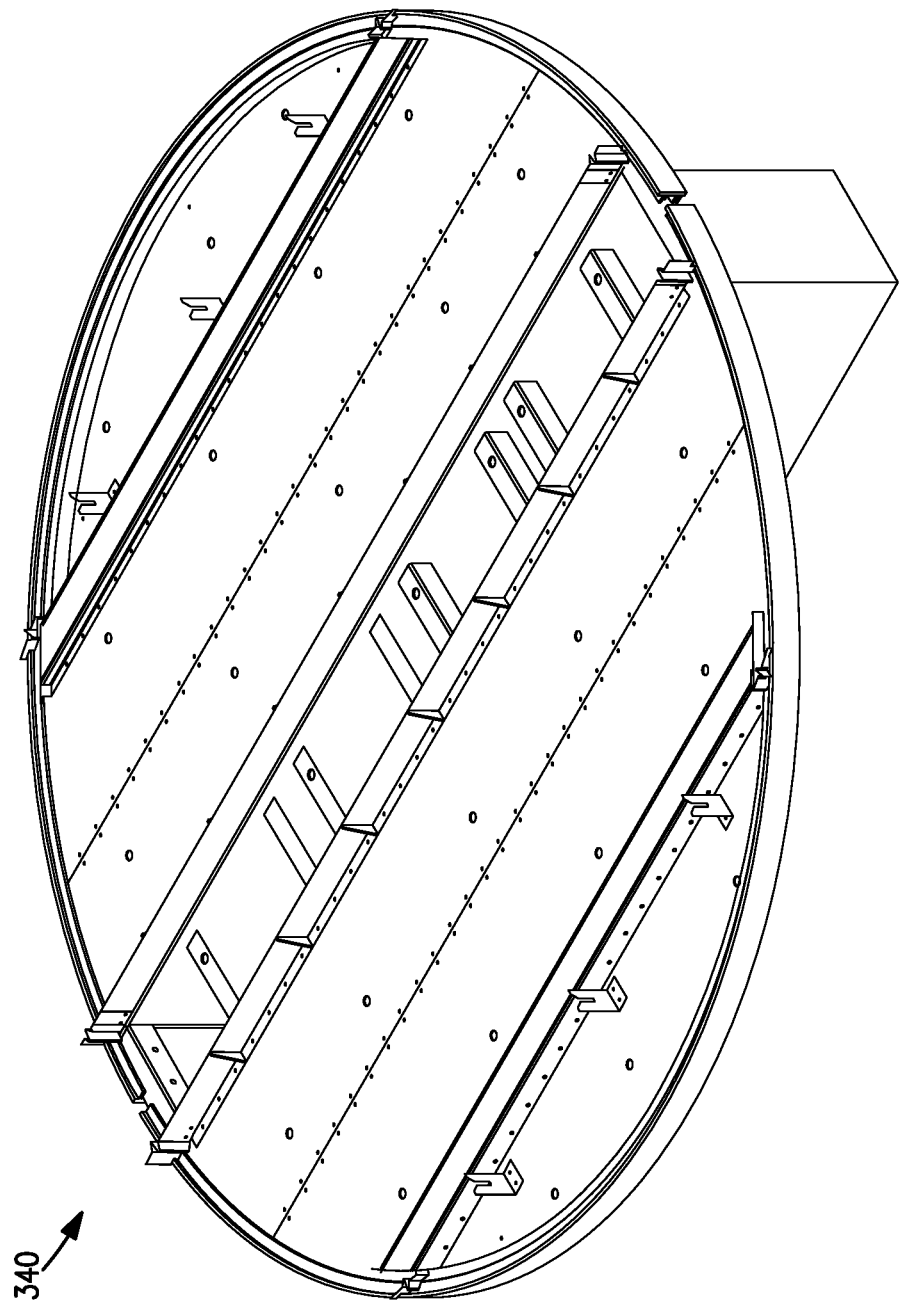
Figure 24:
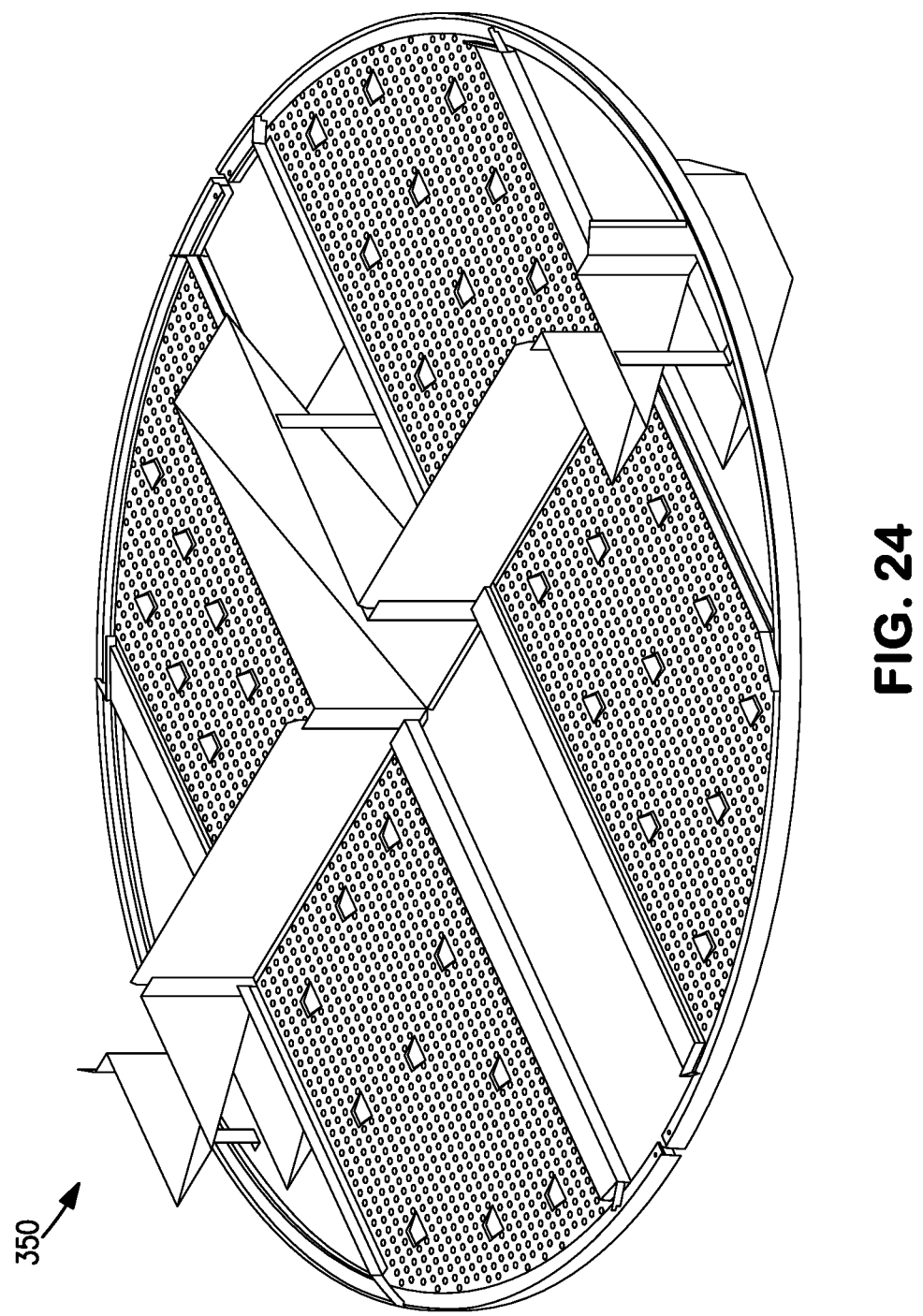
FIG. 24 is an isometric view of a two-pass parallel flow tray suitable for use in one or more embodiments of the present annular divided wall column.
Figure 25:
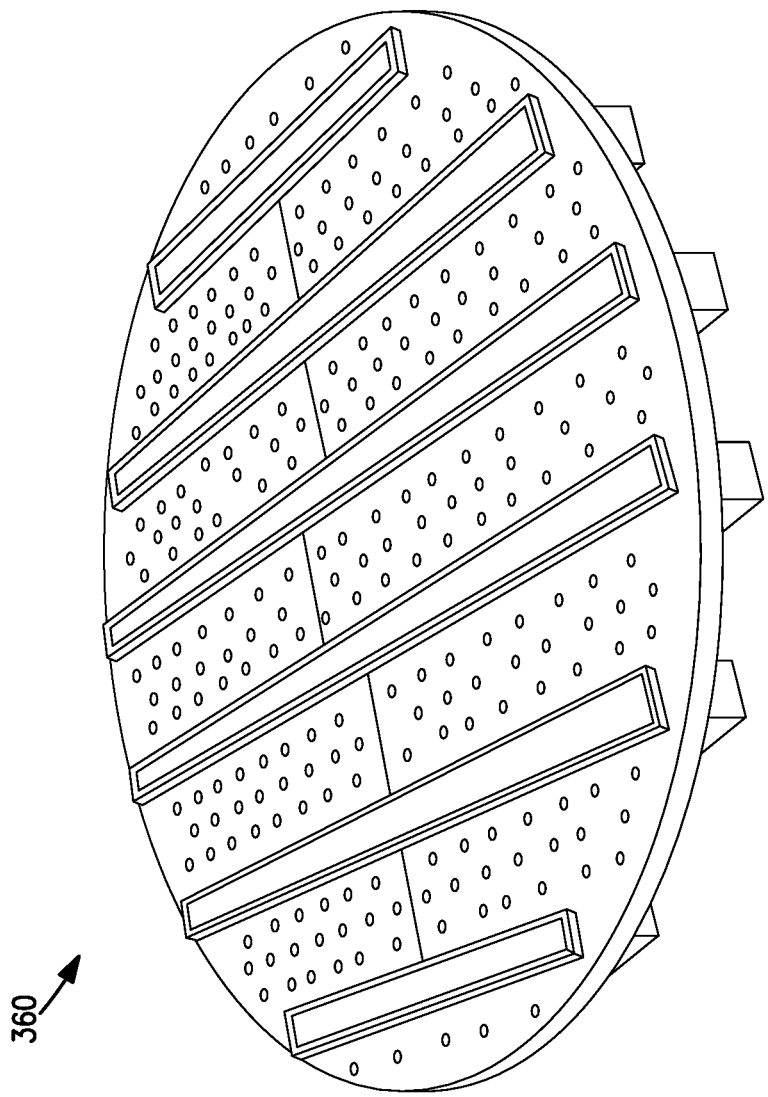
FIG. 25 is an isometric view of a multiple downcomer tray suitable for use in one or more embodiments of the present annular divided wall column.

Turning now to FIGS. 16 and 17, there is shown an embodiment of a three-column divided wall arrangement 200 having three concentric or eccentric annular column walls. In the preferred configuration of the three-column divided wall arrangement 200, the first annular column wall 212 may be defined as the main shell of the air separation column structure. The second annular column wall 216 is disposed within the first annular column wall and a third column wall 217 is placed or disposed exterior to the first annular column wall 214. In this three-column divided wall arrangement, the third column wall 217 is radially spaced from the first annular column wall 212 and surrounds or partially surrounds the first annular column wall to define an outer column region 219 between the first annular column wall 212 and the third column wall 217. As with the two-column divided wall configuration, the vertical height of the third column wall 217 is preferably less than the vertical height of the first annular column wall 212 to form a lower height bubble or blister section to the exterior column shell.

In this three-column divided wall arrangements, an outer cap 222 or outer header covering the outer column region 219 is provided. Such outer cap 222 or outer header preferably extends from the top of the third column wall 217 to an intermediate location of the first annular column wall 212 to partially enclose the outer column region 219.

In FIG. 16 and FIG. 17, the outer column region 219 preferably defines or includes one or more conduits 290 for the movement of vapors and/or liquids within the column while the inner annulus column region 216 preferably contains one or more beds of structured packing elements 255A, 255B as well as the associated collectors 265, distributors 275, support structures, and piping. The interior core column region 218 preferably includes one or more beds of structured packing elements 225A, 225B as well as the associated collectors 235, distributors 245, support structures, caps, and piping. Optionally, the interior core column region 218 may also contain a plurality of trays and/or a heat exchange device disposed toward the lower section of the interior core column regions or even below the bottom of the annulus column region. As with the above-described embodiments, the surface area densities and/or geometries of the structured packing beds in the annulus column region may be the same as or different than the surface area densities and/or geometries of the structured packing beds in the interior core column region or in the other beds of the annulus column region.

While the outer column region 219 of FIGS. 16 and 17 are shown having one or more conduits 290 for the movement of vapors and/or liquids to, from, or within the column structures, it is contemplated that the outer column region 219 may alternatively be designed for mass transfer by employing structured packing and/or trays. Likewise, while the interior core column region 218 of FIGS. 16 and 17 are shown having one or more beds of structured packing elements, it is further contemplated that various embodiments may also include trays in addition to or in lieu of the structure packing elements or even other devices or conduits.

An alternate embodiment of the three-column divided wall arrangements is shown in FIGS. 18 and 19. In this embodiment of the three-column divided wall arrangement, the first annular column wall 252 may be defined as the main shell of the air separation column structure and the second annular column wall 256 is disposed concentrically or eccentrically within the first annular column wall 252. A third column wall 257 is placed within interior space defined by the second annular column wall 256 and divides or segments the interior space into two separate regions, namely a first core interior region 260 and a second core interior region 270.

In FIGS. 18 and 19, the first core interior region 260 preferably defines or includes a heat exchange device 280, a phase separator device and/or one or more conduits for the movement of vapors and/or liquids within the column while the second core interior region 270 preferably contains one or more beds of structured packing elements 225A, 225B as well as the associated collectors 235, distributors 245, support structures, and piping and/or a plurality of trays. The annulus column region 254 preferably includes one or more beds of structured packing elements 255A, 255B as well as the associated collectors 265, distributors 275, support structures, caps, and piping. Again, the surface area densities and/or geometries of the structured packing beds in the annulus column region may be the same as or different than the surface area densities and/or geometries of the structured packing beds in the interior core column region or in the other beds of the annulus column region.

In some embodiments, it may be advantageous to apply a high flux coating or porous coating to an interior surface of the first annular column wall or third annular column wall.

Similarly, a high flux coating or porous coating may also be applied to a surface of the second annular column wall, preferably the surface exposed to the colder fluid. As used herein, the terms 'high-flux coating' and 'porous coating' refers to those coatings that by virtue of its built-in porosity enhance boiling by providing so-called nucleation sites. The porous coating provides micro-scale cavities that have the effect of increasing the number of nucleation sites and bubble departure frequency per site. As a result, the boiling rate can be enhanced. Examples of such high flux coatings or porous coatings are described in U.S. Patent Application Publication Nos. 2017/0108148 and 2017/0108296, the disclosures of which are incorporated by reference.

In other embodiments, the interior surface of the first annular column wall, interior surface of the first annular column wall, or one or more surfaces of the second annular column wall may also include surface texturing. The term "surface texturing", as used herein, is to be understood as denoting any roughening, grooving, fluting, or otherwise forming or impressing a geometric pattern on the wall surface.

Process/Service Arrangements in an Annular Divided Wall Column

In some embodiments, the annular column region is designed or configured for rectification of an argon-oxygen containing stream to separate the argon-oxygen containing stream into an argon-rich overhead stream and an oxygen-rich stream. In other embodiments, the annular column region is designed or configured for rectification of a nitrogen-oxygen containing stream to separate the nitrogen-oxygen containing stream into a nitrogen rich overhead stream and an oxygen-rich stream.

Similarly, the interior core column region is designed or configured for rectification of an argon-oxygen containing stream to separate the argon-oxygen containing stream into an argon-rich overhead stream and an oxygen-rich stream. In other embodiments, the interior core column region is designed or configured for rectification of a nitrogen-oxygen containing stream to separate the nitrogen-oxygen containing stream into a nitrogen rich overhead stream and an oxygen-rich stream.

In yet other embodiments, the annular column region may be designed or configured for rectification of a nitrogen-oxygen containing stream to separate the nitrogen-oxygen containing stream into a first nitrogen rich overhead stream and a first oxygen-rich stream of a first purity and the interior core column region may be designed or configured for rectification of another nitrogen-oxygen containing stream to separate it into a second nitrogen rich overhead stream and a second oxygen-rich stream of a second purity. Alternatively, the annular column region may be designed or configured for rectification of a nitrogen-oxygen containing stream to separate the nitrogen-oxygen containing stream into a first nitrogen rich overhead stream of a first purity and a first oxygen-rich stream while the interior core column region may be designed or configured for rectification of another nitrogen-oxygen containing stream to separate it into a second nitrogen rich overhead stream of a second purity and a second oxygen-rich stream.

Other contemplated process or service arrangements for the annular divided wall column include disposing a heat exchange device or a phase separator device within the interior core column region. The heat exchange device disposed in the interior core column region is preferably either: (i) an argon condenser configured to condense an argon-rich stream for use as a reflux stream, or a liquid argon product stream; (ii) a main condenser-reboiler configured to condense a nitrogen-rich stream for use as a reflux stream or a liquid nitrogen product stream; or (iii) a subcooler configured to subcool a nitrogen-rich liquid stream, an oxygen rich liquid stream, or a liquid air stream for use in the cryogenic air separation plant. In embodiments where a phase separator device is disposed in the interior core column region, the phase separator is preferably configured to separate a two-phase oxygen-containing stream into an oxygen containing liquid stream and an oxygen containing vapor stream.

Still other contemplated process or service arrangements for the annular divided wall column include using the outer column region in a three-column divided wall arrangement as a vapor conduit or disposing one or more vapor conduits within outer column region in a three-column divided wall arrangement that is configured to direct one or more streams to selected locations in the annular column region or the interior core column region.

Mass Transfer Elements in an Annular Divided Wall Column

Turning now to FIGS. 20 through 25, the plurality of mass transfer contacting elements disposed within the annulus column region or interior core column region can be trays, packing or combinations thereof. Where trays are employed in the interior core region of the annular divided wall column, suitable types of trays include: ring trays 310 of the type generally shown in FIG. 20; horseshoe trays 320 of the type shown in FIG. 21; single pass cross flow trays; parallel flow trays 330 of the type shown in FIG. 22; two pass crossflow trays 340 of the type shown in FIGS. 23a and 23b; two pass parallel flow trays 350 of the type shown in FIG. 24; or multiple downcomer trays 360 of the type shown in FIG. 25. Where trays are employed in the annulus column region of the annular divided wall column, suitable types of trays include annular cross flow trays or annular parallel flow trays.

Where packing is employed in either the annulus column region or the interior core column region of the annular divided wall column, possible column packing arrangements include structured packing, strip packing, random packing, or even silicon carbide foam packing, as described in more detail below. Such packing arrangements would further include a plurality of liquid distributors, collectors, or combined collector-distributor devices of the type shown and described in U.S. Pat. Nos. 9,004,460 and 9,457,291, incorporated by reference herein. The preferred embodiments include structured packing as such arrangements advantageously provide lower pressure drop, higher efficiency, higher capacity; and reduced liquid hold-up compared to trays and random packing. However, structured packing is prone to liquid maldistribution.

Structured packing is generally formed from corrugated sheets of perforated embossed metal or plastic, or wire gauze. The resulting structure is a very open honeycomb-like structure with inclined flow channels of the corrugations giving a relatively high surface area but with very low resistance to gas flow. In applications using structured packing, the structured packing is preferably constructed of materials selected from the group consisting of: aluminum sheet metal, stainless steel sheet metal, stainless steel gauze, copper and plastic. The surfaces of the structured packing may be smooth or may include surface texturing such as grooving, fluting, or patterned impressions on the surfaces of the structured packing sheets. Examples of the preferred types of structured packing are shown and described in U.S. Pat. Nos. 5,632,934 and 9,295,925; the disclosures of which are incorporated by reference herein.

The size or configuration of structure packing is broadly defined by the surface area density of the packing and the inclination angle of the corrugated flow channels in the main mass transfer section of the structured packing. The preferred density of the structured packing is between about 100 m$^2$/m$^3$ to 1200 m$^2$/m$^3$ and more preferably are selected from the group of commercially available structured packing having surface area densities of 110 m$^2$/m$^3$; 220 m$^2$/m$^3$; 250 m$^2$/m$^3$; 350 m$^2$/m$^3$; 430 m$^2$/m$^3$; 500 m$^2$/m$^3$; 730 m$^2$/m$^3$; 950 m$^2$/m$^3$; and 1200 m$^2$/m$^3$. The geometry of the structure packing, as characterized by the inclination angle of the corrugated flow channels in the main mass transfer section of the structured packing, preferably includes a nominal inclination angle to the horizontal axis of between about 35° to 70°, which encompasses X-size packing (i.e. nominal inclination angle of about 60°), Y-size packing (i.e. nominal inclination angle of about 45°); and Z-size packing (i.e. nominal inclination angle of about 40°).

Figure 26:
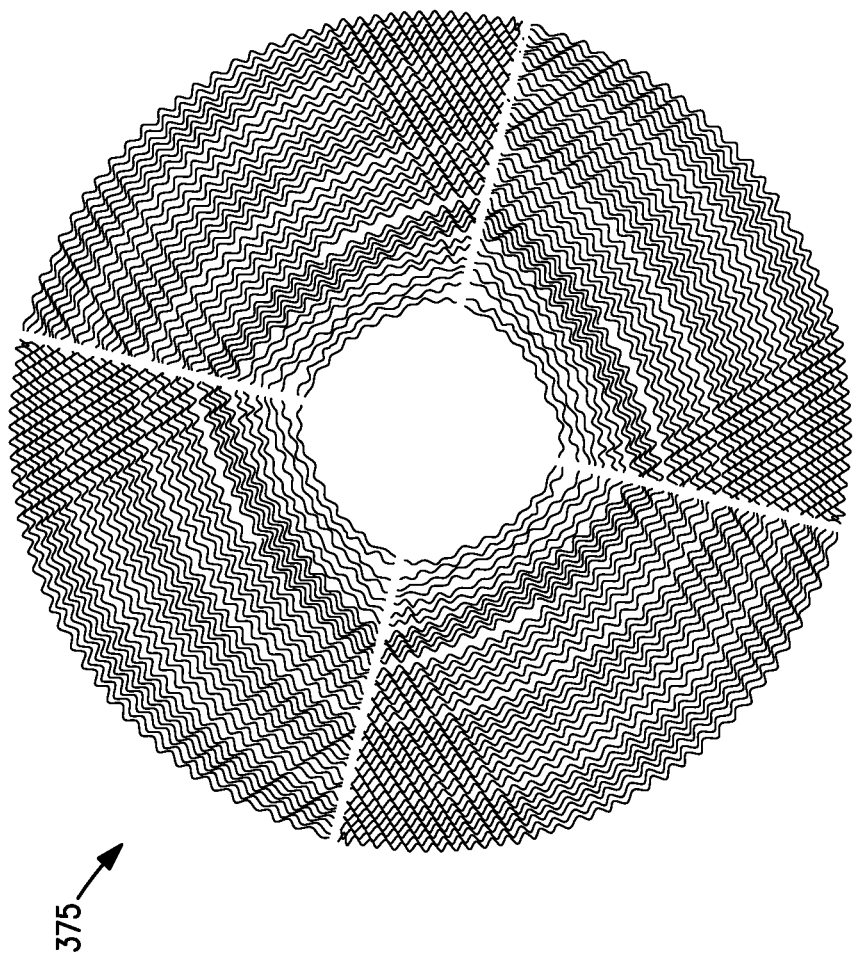
FIG. 26 is a isometric view of a type of arcuate wedge or curved packing suitable for use in one or more embodiments of the present annular divided wall column.

In some embodiments, the structured packing configuration for the annulus column region of the annular divided wall column are a plurality of curved or arcuate wedge shaped bricks 375 or curved bricks, shown in FIG. 26. Alternatively, the structured packing for the annulus column region may be configured as a donut shaped disk or as conventional rectangular bricks. Although the curved or arcuate wedge shaped structured packing bricks can also be used in the interior core column region, the preferred structured packing configuration for the interior core column region are round disks (e.g. pancake packing) or conventional rectangular bricks. The preferred height of the disks and/or bricks is between about 10 and 12 inches, although half-height bricks of 5 inches to 6 inches may also be used. Also, packings with higher pour point densities or drip point densities are often preferred for use in the annulus column region.

Alternatively, structured packing made of silicon carbide may be used in selected applications. Such silicon carbide or other foam like material packing is generally described in U.S. Pat. No. 9,375,655; while in applications using strip packing, the preferred arrangement is similar to that disclosed in U.S. Patent Application Publication No. 2016/0061541. Both disclosures are incorporated by reference herein.

Figure 27A:
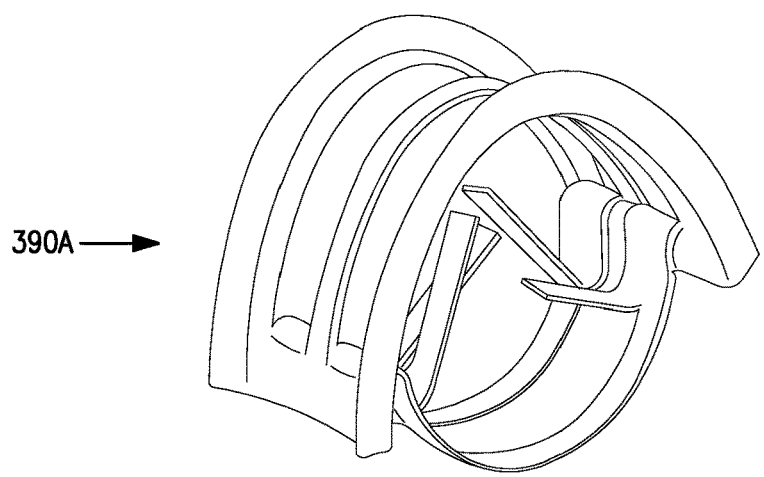
FIGS. 27a, 27b, and 27c are perspective views of various types of random packing suitable for use in one or more embodiments of the present annular divided wall column.
Figure 27B:
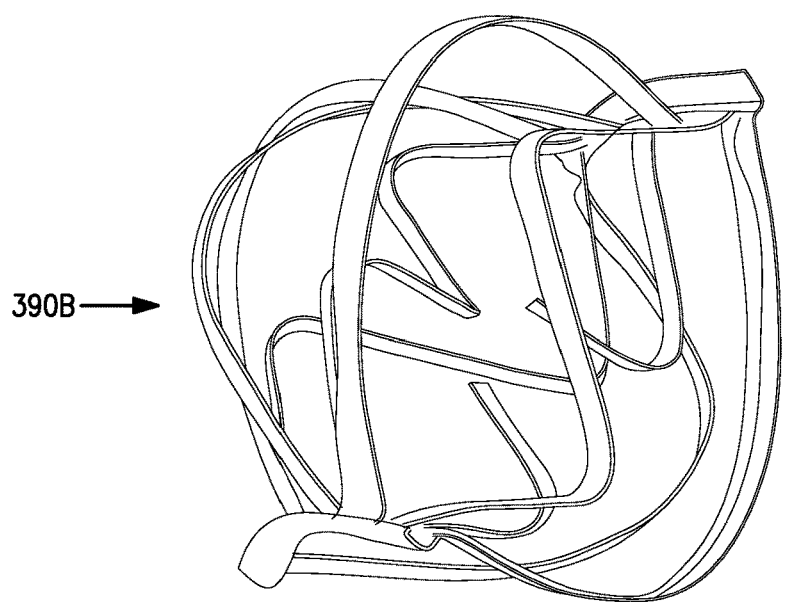
Figure 27C:
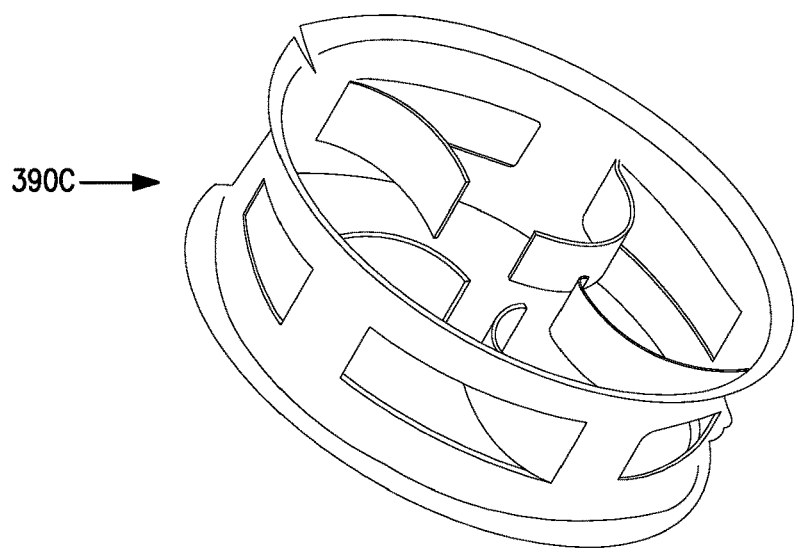

In applications using random packing, the preferred types of random packing elements include proprietary packing selected from the group consisting of: Berl Saddle packing; Rashig Ring packing; Pall® Ring packing; Intalox® Saddle packing; Intalox® Metal Tower Packing (IMTP®); Cascade® MiniRing (CMR®) packing; Nutter Ring® packing; or other commercially available random packing. Such random packing elements preferably have a nominal piece size ranging from about 15 mm to about 100 mm. Examples of several types of random packings 390A, 390B, 390C are shown in FIG. 27.

Examples of different arrangements of structured packing employed within the present annular divided wall column are generally illustrated in FIGS. 28 through 31 and described in the paragraphs that follow. In some embodiments of the annular divided wall column arrangement 400, a plurality of structured packing elements of a first type 455A are disposed within the annulus column region and a plurality of structured packing elements of a second type 425B are disposed within the interior core column region, wherein the first type of structured packing elements 455A and the second type of structured packing elements 425B have different surface area densities. For example, the structured packing elements disposed within the annulus column region may have surface area densities of between about 700 to 1000 m$^2$/m$^3$ whereas the structured packing elements disposed within the interior core column region may have surface area densities of between about 400 to 700 m$^2$/m$^3$.

Similarly, a plurality of structured packing elements of a first type 455A are disposed within the annulus column region and a plurality of structured packing elements of a second type 425B are disposed within the interior core column region, wherein the first type of structured packing elements 455A and the second type of structured packing elements 425B have different geometries. For example, the structured packing elements disposed within the annulus column region may have a nominal inclination angle to the horizontal axis of about 55° to 70° to minimize wall flow whereas the structured packing elements disposed within the interior core column region may have a nominal inclination angle to the horizontal axis of about 45° to 55°.

In other embodiments, the structured packing elements in either the interior core column region or the annulus column region may comprise two or more beds of structured packing. In addition, where multiple beds of structured packing are employed in either region, the adjacent beds may have different surface area densities and/or different geometries. For example, a first bed of structured packing elements 425C of a first surface area density may be disposed within the interior core column region while a second bed structured packing elements 425D of a second surface area density is also disposed within the interior core column region above or below the first bed of structured packing elements 425C of the first surface area density. In such example, the first bed of structured packing elements 425C disposed within the interior core column region may have a surface area density of between about 400 to 700 m$^2$/m$^3$ whereas the second bed of structured packing elements 425D disposed within the interior core column region may have a surface area density of between about 700 to 1000 m$^2$/m$^3$.

Likewise, a first bed of structured packing elements 455E having a first surface area density is disposed within the annulus column region while a second bed structured packing elements 455F having a second surface area density may be disposed within the annulus column region above or below the first bed of structured packing elements 455E. In this example, the first bed of structured packing elements 455E disposed within the annulus column region may have a surface area density of 700 m$^2$/m$^3$ or less whereas the second bed of structured packing elements 455F disposed within the annulus column region may have a surface area density of about 700 to 1200 m$^2$/m$^3$.

Still further, a first bed of structured packing elements 455G having a first geometry or density may be disposed within the annulus column region while a second bed of structured packing elements 455H having a second geometry or density is also disposed within the annulus column region above or below the first bed of structured packing elements 455G. For example, the first bed of structured packing elements 455G disposed within the annulus column region may have a nominal inclination angle to the horizontal axis of about 55° to 70° whereas the second bed of structured packing elements 455H disposed within the annulus column region may have a nominal inclination angle to the horizontal axis of about 45° to 55°. Similarly, the first bed of structured packing elements 425J having a first geometry or density may be disposed within the interior core column region while the second bed of structured packing elements 425K having a second geometry or density is also disposed within the interior core column region above or below the first bed of structured packing elements. An example would be wherein the first bed of structured packing elements 425J may have a nominal inclination angle to the horizontal axis of about 55° to 70° while the second bed of structured packing elements 425K may have a nominal inclination angle to the horizontal axis of about 30° to 55°.

Certain preferred embodiments employ a combination of structured packing elements and trays. For example, a plurality of structured packing elements may be disposed within the interior core column region and a plurality of trays is also disposed within the interior core column region above and/or below the structured packing elements. In such embodiments, the structured packing elements disposed within the interior core column region may have a surface area densities of between about 100 $m^2/m^3$ to 1200 $m^2/m^3$ and a nominal inclination angle to the horizontal axis of between about 35° to 70°, while the plurality of trays may be selected from the group consisting of: ring trays; horseshoe trays; parallel flow trays; two pass crossflow trays; two pass parallel flow trays; multiple downcomer trays; or combinations thereof.

While the present invention has been characterized in various ways and described in relation to the preferred structural embodiments and/or preferred methods, there are numerous additions, changes and modifications that can be made to the disclosed structures and methods without departing from the spirit and scope of the present invention as set forth in the appended claims. For example, while the present annular divided wall column has been shown and described as suitable for use in the cryogenic rectification of air or constituents of air in an air separation unit, it is fully contemplated that such annular divided wall column arrangements may also be suitable for the separation or purification of other industrial gases including off-gases or tail gases of various industrial processes.

We claim:

1. An annular divided wall column comprising:
   a first annular column wall;
   a second annular column wall radially spaced from the first annular column wall and disposed within a first interior space of the first annular column wall to define an annulus column region between the first annular column wall and the second annular column wall and to define an interior core column region as part or all of a second interior space of the second annular column wall;
   a plurality of structured packing elements of a first type disposed within the annulus column region; and
   a plurality of structured packing elements of a second type disposed within the interior core column region;
   wherein the first type of structured packing elements and the second type of structured packing elements have different surface area densities and the surface area densities of the first type of structured packing elements and the second type of structured packing elements are both greater than about 100 $m^2/m^3$; and
   wherein the first type of structured packing elements has a first nominal inclination angle of corrugations and the second type of structured packing elements have a second nominal inclination angle of corrugations that is different than the first nominal inclination angle of corrugations to the horizontal axis, and wherein the nominal inclination angle of corrugations to the horizontal axis for both the first type of structured packing elements and the second type of structured packing elements is between about 35° to 70°.

2. The annular divided wall column of claim 1, wherein the first annular column wall and the second annular column wall are concentrically disposed relative to one another.

3. The annular divided wall column of claim 1, wherein the plurality of structured packing elements of the first type and of the second type are constructed of aluminum sheet metal or stainless steel sheet metal.

4. The annular divided wall column of claim 1, wherein the structured packing elements of the first type and of the second type are configured as rectangular bricks.

5. The annular divided wall column of claim 1, wherein the surface area densities of the first type of structured packing elements and the second type of structured packing elements are selected from a group consisting of: 110 $m^2/m^3$; 220 $m^2/m^3$; 250$m^2/m^3$; 350$m^2/m^3$; 430 $m^2/m^3$; 500 $m^2/m^3$; 730 $m^2/m^3$; 950$m^2/m^3$; and 1200$m^2/m^3$.

6. The annular divided wall column of claim 1, wherein the surface area density of the first type of structured packing elements is greater than or equal to about 700 $m^2/m^3$ and the surface area density of the second type of structured packing elements is between about 100 $m^2/m^3$ and about 700 $m^2/m$.

7. The annular divided wall column of claim 1, wherein the first nominal inclination angle of corrugations to the horizontal axis is between about 50° to 70° and the second nominal inclination angle of corrugations to the horizontal axis is between about 35° to 55°.

8. The annular divided wall column of claim 1, wherein the first nominal inclination angle of corrugations to the horizontal axis and second the nominal inclination angle of corrugations to the horizontal axis are selected from a group consisting of:
   40°; 45°; 50°; 55°; and 60°.

* * * * *